(12) United States Patent
Williams et al.

(10) Patent No.: US 12,264,757 B2
(45) Date of Patent: Apr. 1, 2025

(54) PIPE ALIGNMENT TOOL

(71) Applicant: Specialised Refrigeration Services Ltd, Barrow Upon Humber (GB)

(72) Inventors: Leigh Anthony Williams, Barrow upon Humber (GB); William Anthony Williams, Barrow Upon Humber (GB)

(73) Assignee: Specialised Refrigeration Services Ltd, Barrow Upon Humber (GB)

( * ) Notice: Subject to any disclaimer, the term of this patent is extended or adjusted under 35 U.S.C. 154(b) by 269 days.

(21) Appl. No.: 18/095,027

(22) Filed: Jan. 10, 2023

(65) Prior Publication Data
US 2023/0220931 A1 Jul. 13, 2023

(30) Foreign Application Priority Data

Jan. 10, 2022 (GB) ..................... 2200214

(51) Int. Cl.
*F16L 1/10* (2006.01)
*F16L 55/00* (2006.01)

(52) U.S. Cl.
CPC .............. *F16L 1/10* (2013.01); *F16L 55/00* (2013.01)

(58) Field of Classification Search
CPC .................. F16L 1/10; B25H 7/005
See application file for complete search history.

(56) References Cited

U.S. PATENT DOCUMENTS

| 10,767,985 B1 | 9/2020 | Mays |
| 2017/0363422 A1 | 12/2017 | Pokracki |
| 2021/0190494 A1 | 6/2021 | Lindberg |

FOREIGN PATENT DOCUMENTS

| AU | 2019200184 A1 * | 7/2019 |
| GB | 2560924 A | 10/2018 |
| WO | 2017035605 A1 | 3/2017 |

OTHER PUBLICATIONS

GB Combined Search and Examination Report for Appl. No. GB2200214.1 mail date Jun. 17, 2022, 7 pages.

* cited by examiner

*Primary Examiner* — Jason L Vaughan
*Assistant Examiner* — Amanda Kreiling
(74) *Attorney, Agent, or Firm* — Maine Cernota & Curran

(57) ABSTRACT

Disclosed herein is an alignment tool 1 for a pipe having a bore with a central axis. The tool 1 comprises a main body 22, 32 having one end 26 conforming with an open end of the pipe in use, and an opposite end 34 having mounted thereto a sighting means, wherein the sighting means is configured to discharge a sighting beam in use coaxially with the central axis of the pipe.

6 Claims, 6 Drawing Sheets

PIPE ALIGNMENT TOOL

RELATED APPLICATIONS

This application claims the priority under 35 USC 119(a) of Great Britain Application No. GB2200214.1, filed Jan. 10, 2022, which is herein incorporated by reference in its entirety for all purposes.

FIELD OF THE INVENTION

The invention relates to tools that are applicable to pipes, and more particularly, to an alignment tool for a pipe.

BACKGROUND OF THE INVENTION

In the field of pipework and tubing conduits, when installing or replacing pipes, it is important to set the pipes in the proper alignment before the final installation. Incorrect setting can mean that the pipes don't reach their target destination properly, or when installed will be under undue stress, which will weaken any joints. Setting the proper alignment of pipes is usually achieved with the aid of measurement or alignment with reference points or lines. For example, a pipework engineer/installer might measure the distance the pipe needs to be from a wall or floor and maintain that as constant throughout the length of the pipe to ensure the correct installation. As long as the wall or floor remains constant (i.e. the reference point) then the pipe setting and alignment will remain accurate.

Unfortunately, in a lot of circumstances, such as in big open factories, or other large open spaces, there are no consistent reference points in order to take measurements from to make sure the installed pipes are aligned correctly. In a factory, for example, where the pipe is to be installed from the floor to the ceiling or roof, the side wall of the factory cannot be used as a reference because it has other installations in place, making measurement impossible. The only solution to this problem has been to use plumb lines. This requires an operator to hang a plumb line from the ceiling or roof to the floor, and move it until the plumb touches the point on the floor where the pipe is due to start. The operator then marks the place on the ceiling or roof and he or she knows then that the two points are aligned vertically. And in most cases, this requires two people, one to install the plumb line and the other to mark and measure the point on the floor or ceiling. Furthermore, in order to do this, the operator has to be able to access the ceiling or roof and drop the plumbline down, and this is not always possible. Even if it is possible to access the ceiling or roof, it often takes a great deal of time to achieve, and often requires the use of lifts or scaffolding.

What is needed, therefore, is a pipe alignment tool which overcomes and/or substantially mitigates the above referenced and/or other disadvantages associated with the prior art. are techniques for.

SUMMARY OF THE INVENTION

In an aspect of the invention, there is provided a pipe alignment tool for a pipe having a bore with a central axis, the tool comprising a main body having one end conforming with an open end of the pipe in use, and an opposite end having mounted therein a sighting means, wherein the sighting means is configured to discharge a sighting beam coaxially with the central axis of the pipe, and wherein the end of the tool conforming with an open end of the pipe is formed with a plurality of continuous concentric recesses, one of the plurality of continuous concentric recesses receiving the open end of the pipe therein in use, each of the continuous concentric recesses making up the plurality of continuous concentric recesses having predetermined dimensions which match the outside and the inside of the pipe in use.

The pipe alignment tool according to the invention is advantageous primarily because, in use, the sighting means discharges the sighting beam coaxially with the central axis of the pipe onto which the tool is mounted. Therefore, it is possible to sight where the center of an existing pipe will engage with a wall or feature some distance away. The operator then very quickly and accurately knows where to place a hole or a device to which the pipe is to be connected. The disclosed pipe alignment tool also has the advantage that the tool body can fit over the end of the pipe and is held rigidly in place by virtue of the plurality of continuous concentric recesses having walls which match the outside and the inside of the pipe. Thus, in use, there is no scope for the tool to wobble or become loose on the end of the pipe that would otherwise lead to inaccuracies in the sighting measurements.

The main body of the disclosed tool is preferably plastic, as this is the cheapest and easiest to manufacture. However main body may also be made from metal or composite material.

In the context of the invention, the predetermined dimensions of the recesses refer to the dimensions and shape of the walls of the recess. The dimensions of the walls are selected, prior to use, by the user in manufacturing the tool based on the range of pipes to which the user might want to apply the tool.

Conveniently therefore, the recesses may have standard cross sections of most standard pipe work. For example, if the user were working on refrigeration pipework, then the recesses would be designed with dimensions to fit ½ inch (12.7 mm), ⅞ inch (22.225 mm), 1⅛ inch (28.575 mm) and 1⅜ inch (34.925 mm) diameter pipework. It is noted that refrigeration pipework is set at imperial diameters. It will be understood in other examples, for example household plumbing, then the recesses would be designed with dimensions to fit 9 mm, 12 mm, 15 mm, 19 mm and 22 mm for example. And each recess would have the thickness comparable to that of the thickness of household pipework or refrigeration pipework. If the user was working in an industrial setting, for example in a large factory, then the range of dimensions, and with it the thickness of each recess, might be much larger, or might vary. But in each case, the dimensions of each recess are predetermined based on the dimensions of the pipes being worked on, and therefore the type of work being conducted.

In the context of the present invention, "match" means to conform with or mutually engage with so as to substantially fit. It will be understood that as most pipes are not manufactured or cut to exacting standards, then some tolerance between the thickness of the recesses and the thickness of the pipe is allowed for. However, this tolerance is not so large as to loosen the fit between the pipe and the tool in use. The skilled person would be capable of defining what this tolerance should be without undue effort in order that the tool can work within the above parameters. To this end the inventors have surprisingly found that with a pipe wall thickness of, for example, 1.8 mm, a recess thickness of between 1.6 mm and 2.0 mm would still allow the pipe to fit inside the recess. This is because of the variation and error in the manufacture of pipework, which leads to changes in the diameter. At the same time, because the recesses are continuously concentric, even with the example tolerance described above, the tool surprisingly still remains rigidly attached to the end of the pipe in use. So, in other words, the design is such as to provide a rigid attachment which caters for the small variation in pipe diameters.

In the context of the invention, a "pipe" can mean a tube, pipeline, conduit, pipe fitting, box section member or channel section member. The pipe may be metal, plastic or composite. The pipe may be an electrical pipe, industrial pipe, commercial pipe, or domestic pipe.

The benefit of the plurality of continuous concentric recesses is that a single tool can be used with a plurality of pipes having different pipe dimensions. This is most often the case in industry, where pipe dimensions vary greatly.

The pipe may be any shape in cross-section. Therefore, the recesses can have any shape, depending on the shape of the pipe, but it is recognised that the general shape of the recesses and the general shape of the pipe cross sections must match. Examples of suitable cross sections include, but are not limited to, square or triangular or hexagonal. Preferably, the plurality of continuous concentric recesses have walls which are circular. This is because the majority of plumbing or industrial pipework has a circular cross section.

The sighting means may be fixed permanently into the opposite end. That is to say it, may be integral with the opposite end. This means that the alignment of the sighting means with respect to the body of the tool, and therefore the axis of the pipe, is fixed, and not open to distortion or error over time. Thus, all of the alignment operations performed over time using the tool will be accurate. Preferably though, the sighting means is removably mounted within the opposite end. This allows it to be replaced in case of damage or requiring maintenance, or if the power of the sighting means is required to be altered.

The sighting means may be a light emitting device, such as a lamp or laser. Other suitable sighting means include, but are not limited to, UV or Infrared emitter devices.

Preferably the one end of the tool conforming with an open end of the pipe in use and the opposite end of the tool are removably engageable within one another. This allows interchangeability of the ends, for example if a different sighting means is required, or a different configuration of recesses is required.

In describing that the tool comprises a main body having one end conforming with an open end of the pipe in use, and an opposite end having mounted therein a sighting means, the intended meaning is that the opposite end necessarily projects out of the end of the pipe in use. That is to say, the opposite end is some distance away from the end of the pipe in use, and is not held in some way within the confines of the pipe in use. The benefit of this is that the user can select the relative sizes and dimensions of the sighting means and the recesses. For example, the user may wish to work with sighting small bore pipe work, i.e. 5-22 mm diameter for example. By having the opposite end with the sighting means therein some distance away from the end conforming with the open end of the pipe, this is made possible. It also makes attachment and detachment of the tool to the pipe easy, and without hindrance by the pipe or the recesses.

The tool may comprise one or more spirit level bubbles mounted into the main body. This enables the user to not only to align pipework, but to maintain a specified angle for the pipe work.

As the end of the tool conforming with an open end of the pipe in use and the opposite end of the tool are removably engageable within one another, and the sighting means may be removably mounted within the opposite end, it will be appreciated that the tool may be provided as a kit of parts.

The present invention is a pipe alignment tool for a pipe having a bore with a central axis. The tool includes a main body having one end conforming with an open end of the pipe in use, and an opposite end having mounted therein a sighting means, wherein the sighting means is configured to discharge a sighting beam coaxially with the central axis of the pipe. The end of the tool conforming with an open end of the pipe is formed with a plurality of continuous concentric recesses, one of the plurality of continuous concentric recesses receiving the open end of the pipe therein in use, each of the continuous concentric recesses making up the plurality of continuous concentric recesses having predetermined dimensions which match the outside and the inside of the pipe in use.

In embodiments, the sighting means is removably mounted within the opposite end.

In any of the above embodiments, the plurality of continuous concentric recesses can have walls which are circular.

And in any of the above embodiments, the one end of the tool conforming with an open end of the pipe in use and the opposite end of the tool can be removably engageable within one another.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

The invention will now be described by way of example only, with reference to the following figures in which like numerals represent like features.

DETAILED DESCRIPTION

Figure 1:
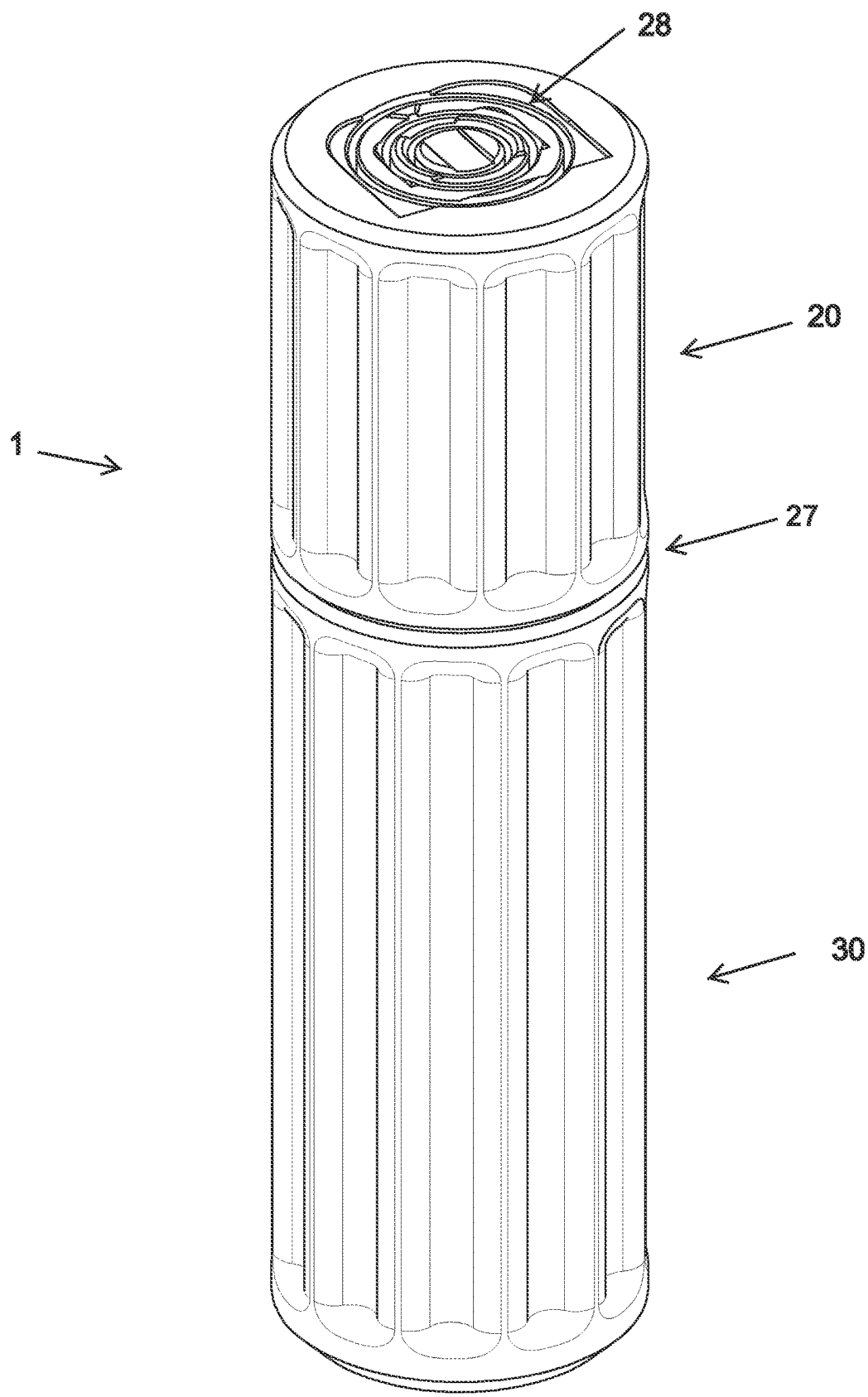
FIG. 1 shows a perspective view of a first embodiment of the tool.

In FIG. 1 there is shown an example of the tool according to the invention. The tool is generally designated 1. In this example the tool 1 is in two parts, a pipe part 20 and a laser part 30. The pipe part 20 comprises a series of recesses (generally designated 28) which are configured to receive the open end of a pipe (not shown) in use. The laser part 30 has mounted therein a battery powered laser pointer 39 (See FIG. 3). The pipe part 20 and laser part 30 are connected to one another in use by a screw thread 27 (See FIGS. 2 and 4). Both the pipe part 20 and the laser part 30 in this example have circular external cross sections. Not only that, but the exterior surfaces of the pipe part 20 and the laser part 30 are indented in multiple places around the circumference to aid with grip of the parts. In this example, the pipe is a commercial gas pipe for refrigerant, but may alternatively be a plastic electrical conduit or steel box section tube. This example will now be described in greater detail.

Figure 2:
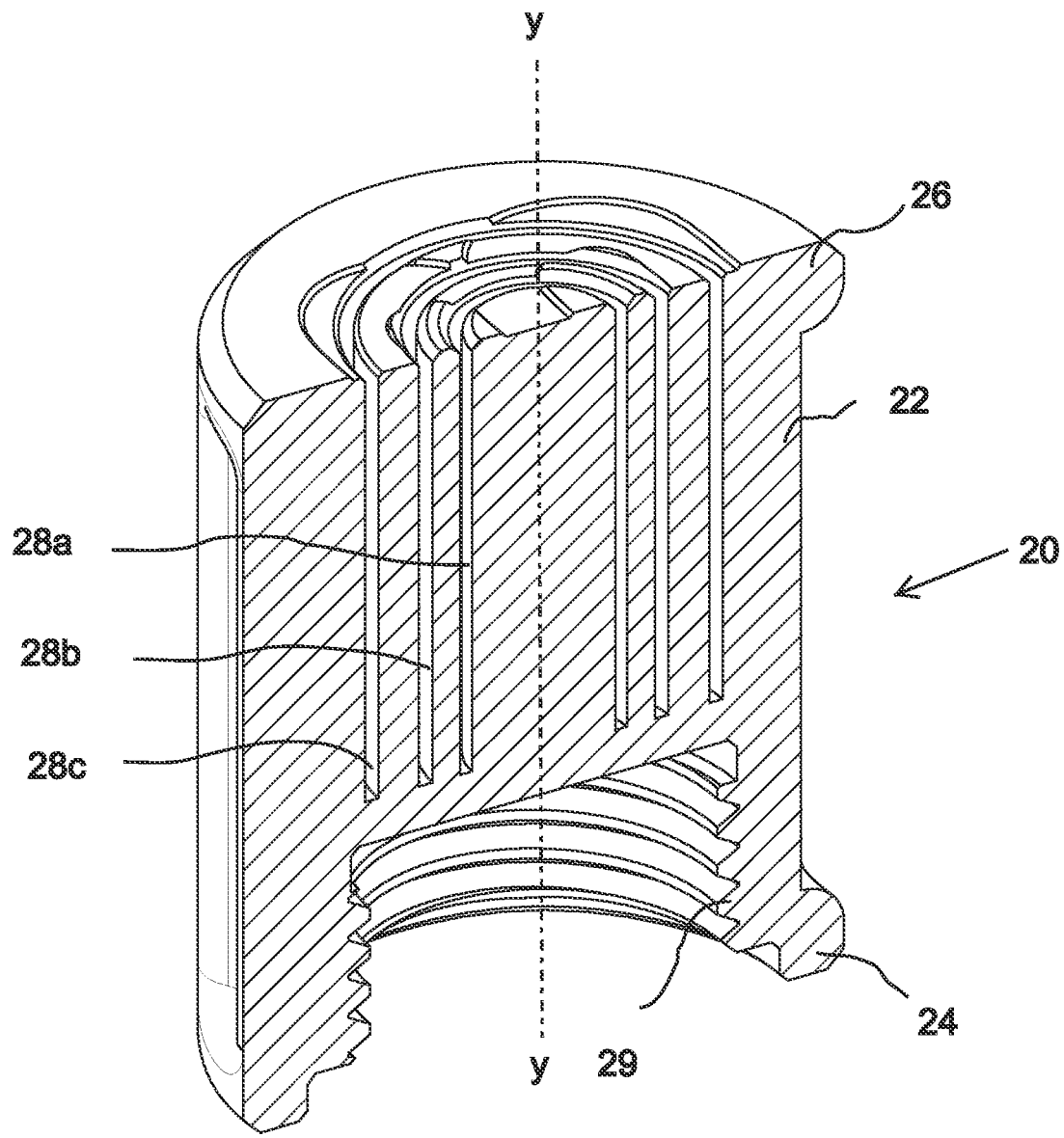
FIG. 2 shows a perspective sectional view of the pipe end of the tool as shown in FIG. 1.

The pipe part 20, shown in cross sectional detail in FIG. 2, is made up of a plastic body 22. The body 22 itself has a distal end 24 and a proximal end 26. The proximal end 26 of the body 22 is formed into a plurality of continuous concentric recesses 28*a, b* and *c*. The recesses 28*a, b* and *c* are of increasing diameter, respectively. These diameters are predetermined based on the range of pipe diameters used for refrigeration, and are respectively ⅝ inches (15.875 mm) for recess 28*a*, 1⅜ inches (34.925 mm) for recess 28*b*, and 2⅛ inches (53.975 mm) for recess 28*c*. Each recess 28*a, b* and *c* has straight parallel sided walls and an end wall.

It will be appreciated though that the scope of the invention herein described is not limited by these specifications, and that in other examples the tool is substantially the same, but with different diameter and dimensions of recesses. In another example, the tool is substantially the same, except that the diameters are 5 mm, 10 mm and 15 mm for recess 28*a, b* and *c*, respectively.

The depth of each recess 28*a, b* and *c* (i.e. the distance from the proximal end to the end wall) is approximately 50 mm. Each recess 28*a, b* and *c* is approximately the thickness of the pipe to be inserted therein. In this example, the pipe has a wall thickness of 1.8 mm, and therefore each recess 28*a, b* and *c* has parallel side walls which are approximately 1.8 mm apart, or just enough to allow for a snug fit of the tool over the end of the pipe.

The distal end 24 of the body 22 is formed into a female screw thread 29. The pipe part 20 has a central axis y-y which runs from the center of the distal end 24 to the center of the proximal end 26. The female screw thread 29, and the recesses 28*a, b* and *c* are all coaxial with the central axis y-y.

Figure 3:
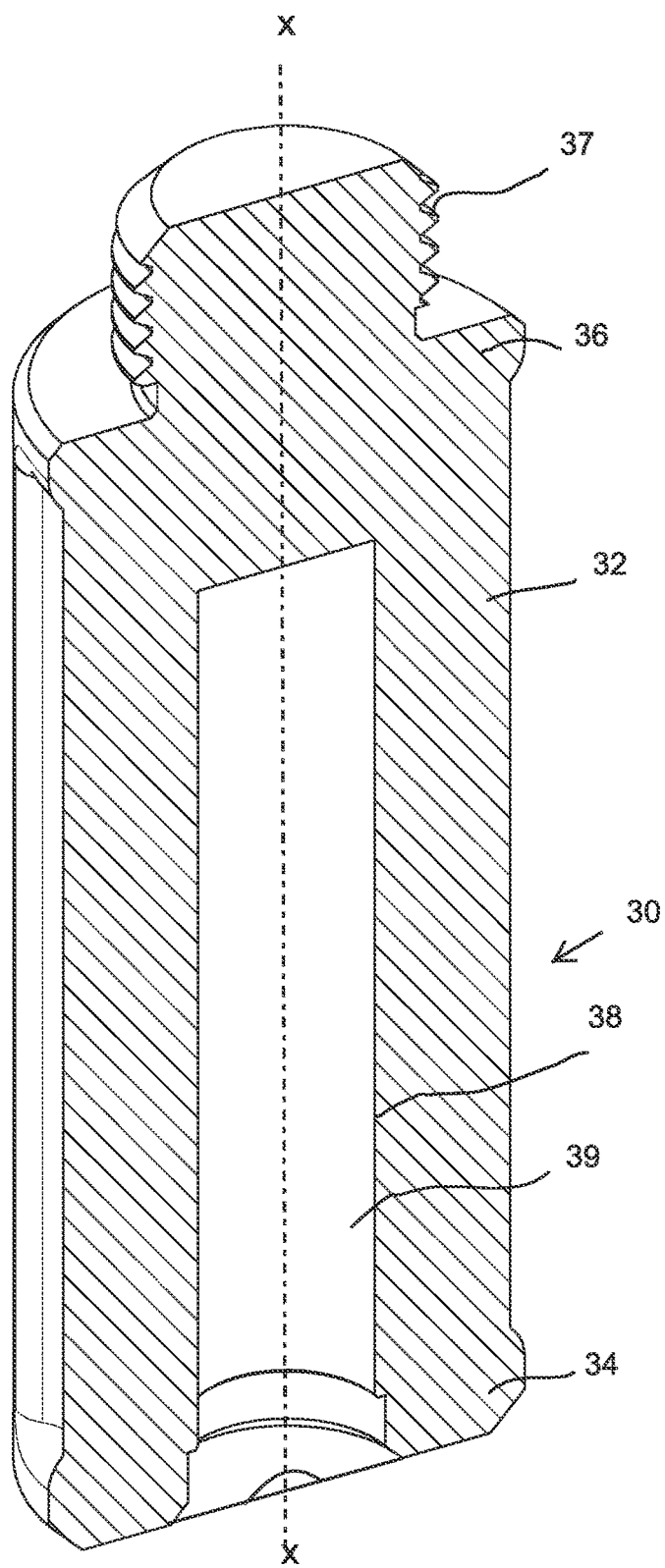
FIG. 3 shows a perspective sectional view of the laser end of the tool as shown in FIG. 1.

The laser part 30 shown in FIG. 3 is made up of a plastic body 32. The body 32 itself has a distal end 34 and proximal end 36. The proximal end 36 of the body 32 is formed into a male screw thread 37 which is dimensioned to match the female thread 29 on the body 22 of the pipe part 20. The distal end 34 of the body 32 has a recess 38 in which can be mounted a battery powered laser pointer 39. The recess 38 is approximately 50 mm deep in this example, and 25 mm wide. The laser part 30 has a central axis x-x which runs from the center of the distal end 34 to the center of the proximal end 26. The male screw thread 37, the central axis of the laser pointer, and the axis which the laser pointer 39 shines at in use are coaxial with the central axis x-x. In embodiments, the laser pointer 39 is retained within the recess 38 by a clamping mechanism (not shown), whereby half of the end of the distal part of the body 32 is made removable. When the laser pointer 39 is introduced into the recess 38, this removable part is positioned back in place again and tightened onto the laser 39 using screws set in the removable part which engage with the remainder of the distal part. Thus, the laser 39 is clamped in place within the recess 38. In other embodiments, the tool is substantially the same, but the laser 39 is retained within the recess 38 by interference fit.

Figure 4:
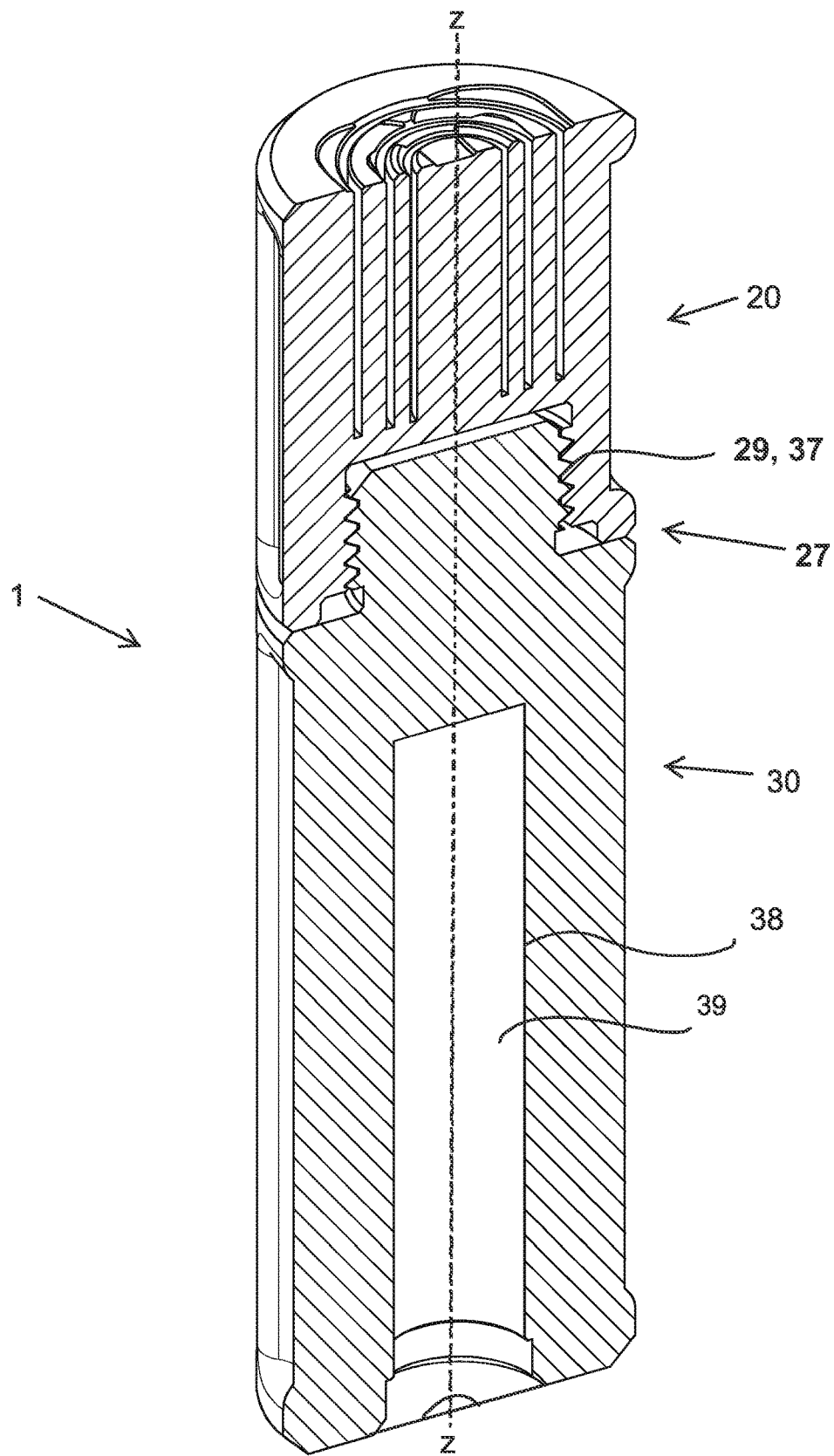
FIG. 4 shows a perspective sectional view of the pipe end and the laser end engaged together to form the tool as shown as FIG. 1.

In use, the pipe part 20 and the laser part 30 are engaged with one another, by screwing the plastic body 32 into the plastic body 22 at the male and female screw threads 29, 37 respectively. FIG. 4 shows a cross section of the arrangement of the tool 1 when the two parts 20, 30 are engaged together as described. A new central axis z-z which is the formation of axis x-x and y-y thereby runs through the tool 1 from the proximal end 26 of the pipe part 20 to the distal end 34 of the laser part 30. The tool 1 is then inserted into and over the open end of the pipe to be aligned (not shown). This is done by matching up the open ended pipe with the correct recess 28*a, b* or *c* in the proximal end 26 of the pipe part 20, and engaging the two together, to allow the pipe part 20 to enter the open ended pipe until the end of the pipe part meets the end wall of the respective recess 28*a, b* or *c*. When inserted in this way the inside and outside walls of the respective recess 28*a, b* or *c* closely match the inside and outside walls respectively of the open end of the pipe and the tool 1 is held rigidly by the end of the pipe.

The laser is then switched on, and the laser beam shines along an extension of central axis z-z. As this central axis z-z runs though the center of the tool 1, it is also coaxial with the central axis of the open-ended pipe. Therefore, the laser beam is coaxial with the central axis of the open-ended pipe. A user can then mark on a distant surface such as a ceiling, roof or wall, where the laser beam hits said surface. The user then knows the point on the surface where the pipe is going to align with. For example, the user may need to drill a hole in the ceiling or the roof for example, and needs to know where to place the hole for the pipe to go through. The ceiling or roof may be some distance away from the open end of the pipe, and no other reference points can be found to derive this alignment point on the ceiling or roof. Using the tool 1, the user can quickly derive the alignment point and drill the hole. The user then knows that the pipe, when extended, will engage exactly with the hole in the ceiling or roof. The tool 1 may also be used for aligning pipes though walls or floors etc., or other materials.

It should be noted that a benefit of having a two-part tool 1 is that the parts are interchangeable. This broadens the number of recesses or dimensions of the recesses that can be used in the pipe end, and similar broadens the number of types of laser attachments that might be used in the laser part 30.

Figure 5:
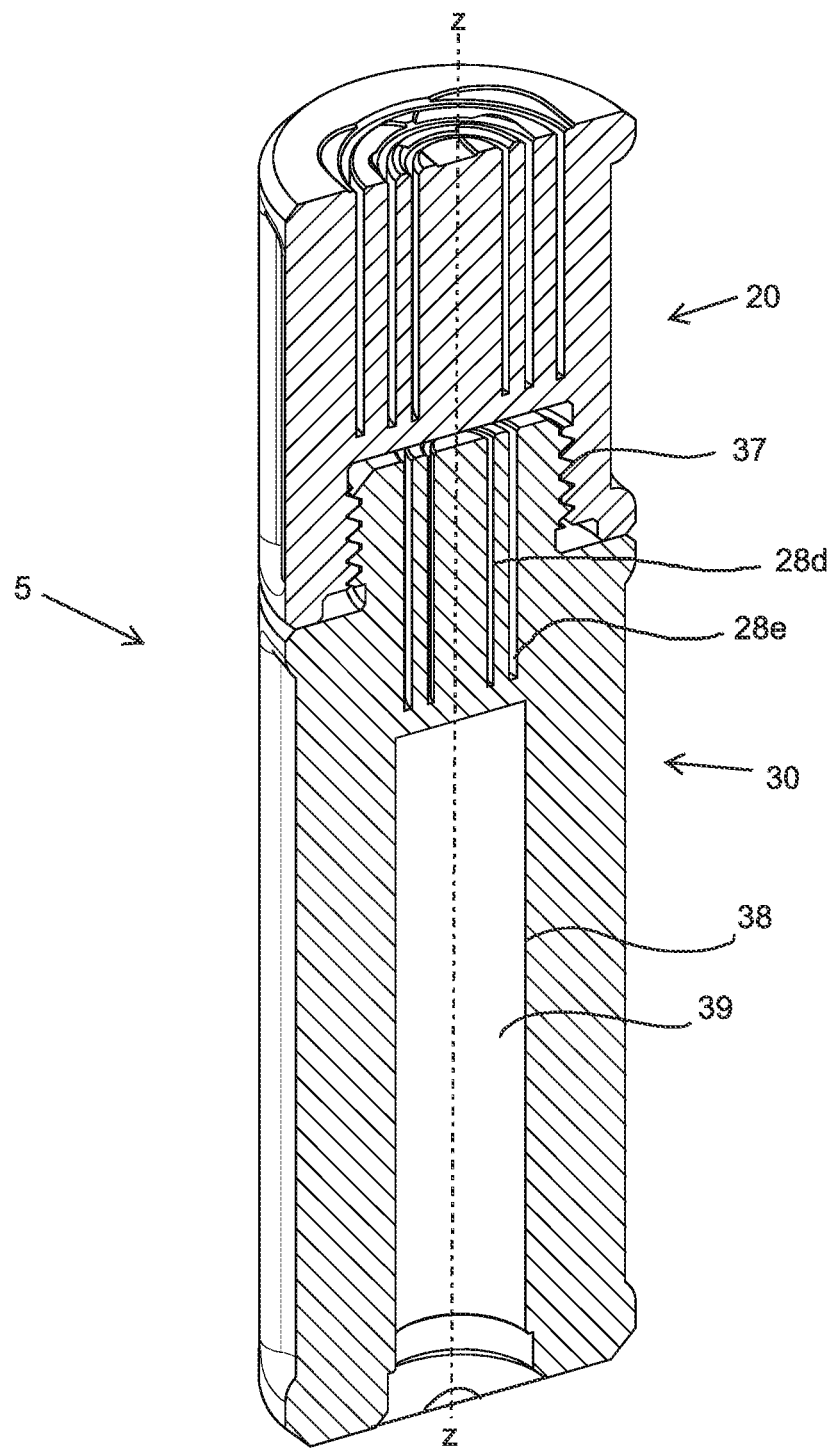
FIG. 5 shows a perspective sectional view of the pipe end and the laser end of a second embodiment of the tool engaged together.

In another embodiment of the invention, the tool 5 is substantially as described above, (i.e. the tool 5 is in two parts), except that the laser part 30 at its proximal end 36 has a number of continuous circular recesses indicated as recesses 28*d* and 28*e*, as shown in FIG. 5. These recesses 28*d* and *e* are substantially the same as recesses 28*a, b* and *c*, but are of different diameters. Recess 28*d* has a diameter of ½ inch (12.7 mm) and recess 28*e* has a diameter of ¾ inches (19.05 mm). In this instance the tool is used without the pipe part 20, and one of the recesses 28*d* or 28*e* is inserted over the end of the pipe in use, in a similar manner as described above. This allows the tool to be used as a single part if required, and also to give the user greater range of pipe diameters that the tool can be used on. This embodiment is akin to the example provided with respect to FIG. 6 described below, which describes a solely single part device.

Figure 6:
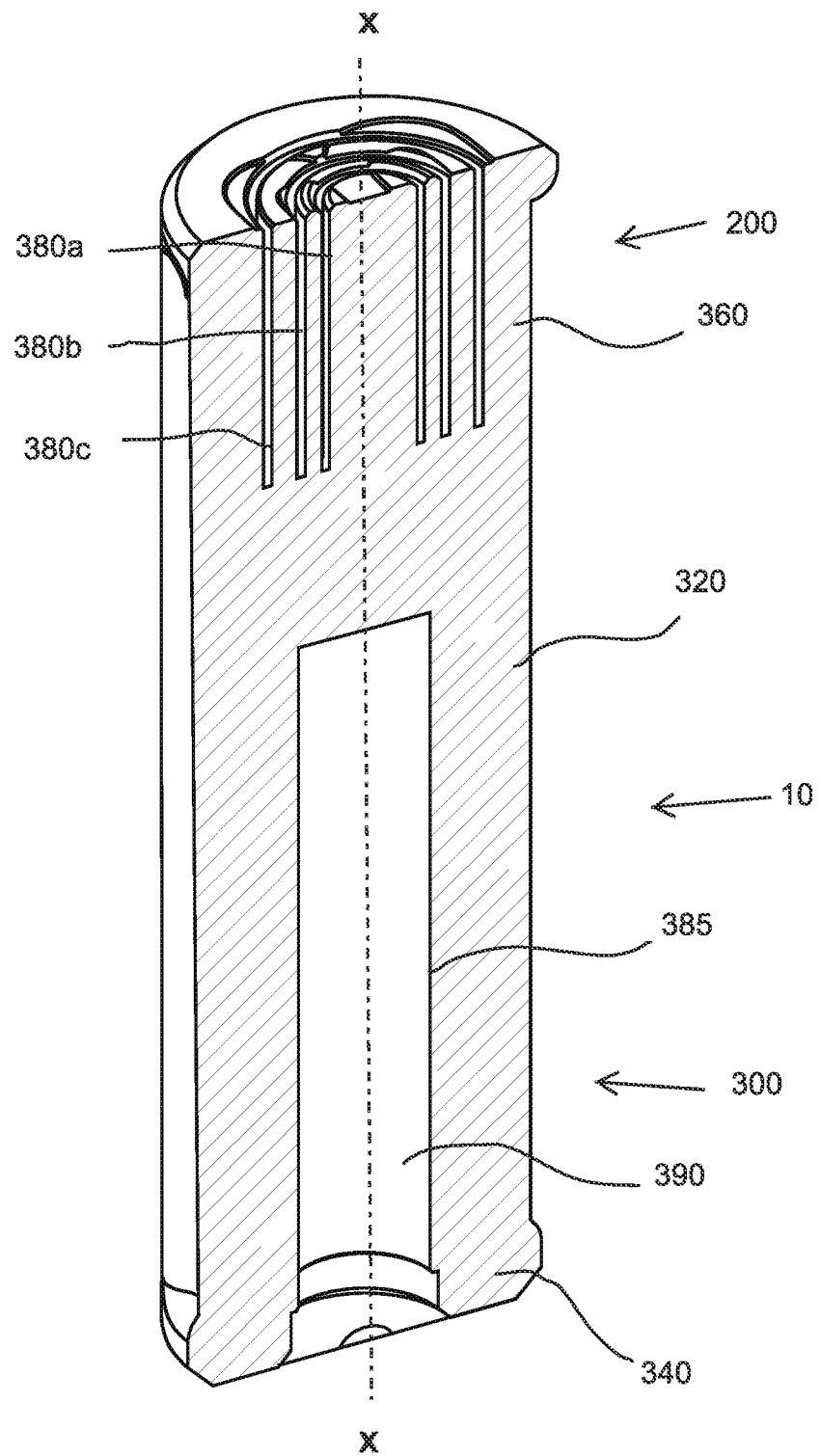
FIG. 6 shows a perspective sectional view of a third embodiment of the tool.

In another example of the invention, as shown in FIG. 6, the tool 10 is provided as a single part. The tool 10 comprises a plastic body 320 which is made up of a pipe portion 200 in the proximal end 360 and a laser portion 300 in the distal end 340. The pipe portion 200 comprises a series of continuous circular recesses 380*a*, 380*b*, and 380*c* which are configured to receive the open end of a pipe (not shown) in use. The laser portion 300 has a recess 385 within which is mounted a battery powered laser pointer 390 in the same manner as described above. Both the pipe portion 200 and the laser portion 300 in this example have a circular external cross section. Not only that, but the exterior surfaces of the pipe portion 200 and the laser portion 300 are indented in multiple places around the circumference to aid with grip of the parts. In this example, the pipe is a commercial gas pipe for refrigerant, but may alternatively be a plastic electrical conduit or steel box section tube.

The recesses 380*a*, 380*b*, and 380*c* in the tool 10 in FIG. 6 are substantially as described above for the other embodiments described herein. The recesses 380*a*, 380*b*, and 380*c* are of increasing diameter respectively. These diameters are predetermined based on the range of pipe diameters used for industrial refrigeration and are respectively ½ inches (12.7 mm) for recess 380*a*, and ¾ inches (19.05 mm) for recess 380*b* and 1⅛ inches (28.575 mm) for recess 380*c*. Each recess 380*a*, 380*b*, and 380*c* has straight parallel sided walls and an end wall. It will be appreciated that other embodiments in include more than just the three recesses 380*a*, 380*b* and 380*c* shown in FIG. 6.

In use of the tool 10 in FIG. 6, the tool is mounted onto the end of the pipe by engaging either of the recesses 380*a*, 380*b*, or 380*c* with the open end of the pipe in a similar manner as described above for the other embodiments. The laser 390 is switched on in the same manner also, and the tool 10 is used and functions in the same manner as described above. The laser beam shines along an extension of the axis x-x which is coaxial with the central axis of the pipe to assist the user in sighting where the pipe is due to engage with a wall or ceiling some distance away.

In other embodiments of the invention the tool is substantially as described above, but alternative diameters and/or dimensions of recesses are incorporated into the tool, in order to allow for different pipe diameters and/or dimensions. For example, the user may need a first tool for a range of metric pipe diameters and a second tool for a range of imperial pipe diameters. With reference to the above, in embodiments this can be achieved by simply replacing the pipe part 20 with a pipe part 20 adapted for a different working set of pipes.

In another example of the invention (not shown), the tool is substantially as described above, except that the recesses are of a continuous square cross section. This allows the user to use the tool with square cross section pipework.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A pipe alignment tool for a pipe having a bore with a central axis, the tool comprising a main body comprising a pipe part and a sighting part, the pipe part having a proximal end conforming with an open end of the pipe in use, and the sighting part having mounted therein a sighting means;
    wherein the sighting means is located within a recess provided in a distal end of the sighting part and does not extend beyond the recess;
    wherein the sighting means is configured to discharge a sighting beam coaxially with the central axis of the pipe, and
    wherein the proximal end of the pipe part is formed with a plurality of continuous concentric recesses, one of the plurality of continuous concentric recesses receiving the open end of the pipe therein in use, each of the continuous concentric recesses making up the plurality of continuous concentric recesses having predetermined dimensions which match the outside and the inside of the pipe in use.

2. The alignment tool according to claim 1, wherein the sighting means is removably mounted within the sighting part.

3. The alignment tool according to claim 1, wherein the plurality of continuous concentric recesses have walls which are circular.

4. The alignment tool according to claim 1, wherein the pipe part and the sighting part are removably engageable within one another.

5. The alignment tool according to claim 1, wherein the sighting means comprises a laser.

6. The alignment tool of claim 1, wherein the sighting means is removably mounted in the sighting part.

* * * * *